(12) United States Patent
Takahashi et al.

(10) Patent No.: US 6,447,170 B1
(45) Date of Patent: Sep. 10, 2002

(54) LOCKING AND UNLOCKING MECHANISM OF CABLE CONNECTOR AND METHOD FOR LOCKING AND UNLOCKING

(75) Inventors: Wataru Takahashi; Kazuya Kikuchi; Yoshihiro Kuroi, all of Tokyo (JP)

(73) Assignee: NEC TOKIN Corporation, Miyagi (JP)

( * ) Notice: Subject to any disclaimer, the term of this patent is extended or adjusted under 35 U.S.C. 154(b) by 0 days.

(21) Appl. No.: 09/605,307

(22) Filed: Jun. 28, 2000

(30) Foreign Application Priority Data

Jun. 29, 1999 (JP) ............................................ 11-184285

(51) Int. Cl.[7] ................................................. G02B 6/36
(52) U.S. Cl. .......................... 385/53; 439/352; 439/357
(58) Field of Search .................... 385/53; 439/352–357, 439/258, 180

(56) References Cited

U.S. PATENT DOCUMENTS

| | | | | |
|---|---|---|---|---|
| 4,915,642 A | * | 4/1990 | Lin et al. ..................... | 439/352 |
| 5,564,939 A | * | 10/1996 | Maitani et al. ............. | 439/352 |
| 5,653,606 A | * | 8/1997 | Chrysostomou ............ | 439/352 |
| 5,779,495 A | * | 7/1998 | Dechelette et al. ......... | 439/352 |
| 5,951,316 A | * | 9/1999 | Kawano et al. ............. | 439/352 |

FOREIGN PATENT DOCUMENTS

| | | | | |
|---|---|---|---|---|
| JP | | 4-25807 | 1/1992 | ............ G02B/6/36 |

* cited by examiner

*Primary Examiner*—Khiem Nguyen
(74) *Attorney, Agent, or Firm*—Hayes Soloway PC (57) ABSTRACT

A locking and unlocking mechanism of a cable connector, consisting of a connector and a housing, and a method for locking and unlocking the cable connector capable of providing a reliable connection of a cable even when a cable connecting operation is carried out by holding the cable. The connector is unlocked from the housing by sliding the lock release mechanism from the set position to the release position when the connector is fitted in the housing. At the time of connecting the cable, when the cable holding member is inserted into the housing while holding the cable, the elastic beam portion of the housing is pushed to open by the protrusion of the lock release member, and the engaging hole formed in the elastic beam portion is engaged with the engaging pawl of the cable holding member, and the connector is installed into the housing by moving the lock release member to the set position by the elastic energy of the lock release member from the elastic deformation caused by being pushed by the cable holding member.

10 Claims, 11 Drawing Sheets

LOCKING AND UNLOCKING MECHANISM OF CABLE CONNECTOR AND METHOD FOR LOCKING AND UNLOCKING

BACKGROUND OF THE INVENTION

1. Field of the Invention

The present invention relates to a locking and unlocking mechanism of a cable connector and a method for locking and unlocking the same.

2. Background Art

Figure 14:
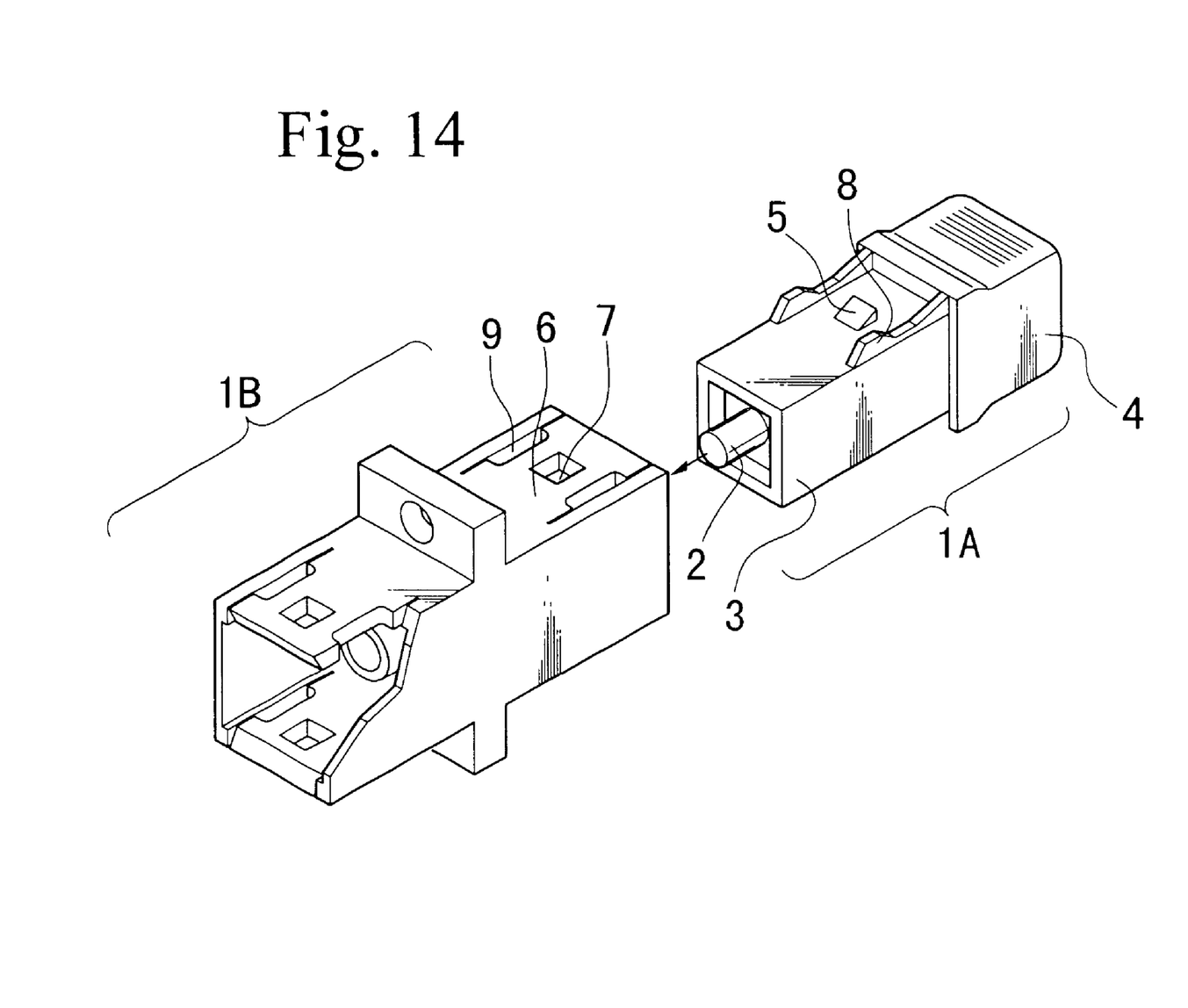
FIG. 14 is a perspective view of a conventional example of the locking and unlocking mechanism.

A mechanism, which has a structure, for example, of inserting a plug 1A into an adapter 1B, is known as shown in FIG. 14. In FIG. 14, the plug 1A comprises, for example, a cable holding member 3 for holding an end of a cable 2, such as an optical fiber cable and a lock release member 4, slidably installed at the outside of the cable holding member 3 in the direction for installing the cable holding member 3. The adapter 1B receives the cable holding member 3 for inserting the cable 2 through the cable holding member 3.

The cable holding member 3 comprises an engaging pawl 5 and an engaging hole 7 is formed in an elastic beam portion 6 of the adopter 1B. Two protrusions 8 are formed on both sides of the engaging pawl 5 on the lock release member 4. Here, the numeral 9 denotes a notched portion for receiving the protrusions 8 of the lock release member 4.

Accordingly, when the plug 1A is connected to the adapter 1B, since the protrusions 8 of the lock release member 4 pushes up the elastic beam portion 6 by inserting the cable holding portion 3 into the adapter 1B, while gripping the lock release member 4, the engaging pawl of the cable holding member 3 is further inserted for being engaged in the engaging hole 7 in the elastic beam portion 6. At the same time, the protrusions 8 of the above-described lock release member 4 are received in the notched portion 9.

In contrast, when the plug 1A is extracted from the adapter 1B, since the protrusions 8 of the lock release member 4 pushes up the elastic beam portion 6 of the adapter 1B, while the engaging pawl 5 of the cable holding member 3 is engaged in the engaging hole 7 in the elastic beam portion 6, the engaging pawl 5 of the cable holding member 3 is extracted from the engaging hole 7 in the elastic beam portion 6. When the plug 1A is further drawn through the lock release member 4, the plug 1A is released from the adapter 1B. The above-described connecting structure is disclosed in Japanese Unexamined Patent Application, First Publication No. Hei 4-25807.

In the above-described conventional technique, since it is necessary to release the engagement of the engaging pawl 5 of the cable holding member 3 with the engaging hole 7 in the elastic beam portion 6 by pushing up the elastic beam portion potion 6 by the use of protrusions 8 of the lock release member, irrespective of whether the plug 1A is inserted into the adapter 1B or the plug 1A is extracted from the plug, the lock release member 4 is slidably attached to the cable holding member 3, such that the protruded portion 8 of the lock release member 8 can be transferred along the attached direction within a range wherein the protruded portions 8 are located across the engaging pawl 5 of the cable holding member 3.

Thus, there is no problem in the case of installing a plug 1A into an independent adapter 1B while gripping the lock release member 4, but a problem is encountered in inserting the plug 1A into an adapter 1B by gripping the lock release member 4 when a plurality of adapters are in a densely mounted array, because adjacent lock release members disturb the accurate positioning of the lock release member 4.

Under these circumstances, it is assumed that the plug 1A is inserted into the adapter 1B by gripping the cable 2. However, since the lock relese member 4 is slidable for the cable holding member 3, when the cable is pushed into the adapter 1B, the cable holding member 3 is inserted into the adapter 1B towards the lock release member 4. Thus, the protrusions 8 of the lock releasee member 4, which comes later than the cable holding member 3, cannot move forward while the protrusions 8 of the lock release member 4 push the elastic beam portion 6 upward, and as a result, a problem arises that the engaging pawl 5 cannot become engaged in the engaging hole 7, and this state is called half engaged state.

If the plug 1A in the half engaged state is located at the outside of the densely mounted array of adapters 1B, it is possible to insert or draw the plug 1A easily. However, if the plug 1A in the half engaged state is located in the middle of the matrix of the adapters 1B, the already inserted plugs 1A surrounding the half engaged plug must be extracted in order to extract the half engaged plug, which results in causing a problem that the number of operations increases. In addition, if the half engaged plug is left as it is, and if the cable connected by the half engaged plug is drawn during operation of the system, a problem arises that malfunction may be encountered in a system, which may be, for example, an electronic exchange system.

SUMMARY OF THE INVENTION

It is therefore an objective of the present invention to provide a locking and unlocking mechanism, capable of providing reliable connection even during operation while gripping the cable and also provide a locking and unlocking method.

The first aspect of the present invention provides a locking and unlocking mechanism for locking and unlocking the connector comprising a cable holding member for holding an end of a cable and a lock release member slidably attached to the outside of the cable holding member, to the housing for receiving said connector and for conducting the cable; wherein, at the time of inserting the connector, a pushing operation of the lock release member allows connection of a lock release member to a housing by setting the lock release member at a set position by engaging of the engaging pawl provided with one of the cable holding member or the lock release member with an engaging portion provided with the other one of the cable holding member and the lock release member by pushing up the elastic beam portion provided in one of the cable holding member and the lock release member by means of a protrusion provided with the other one of the cable holding member and the lock release member; at the time of extracting the connector, the connector is released from the housing by sliding the lock release member in the releasing direction for pushing up the elastic beam member by the protrusion; and the lock and unlock mechanism further comprises an automatic retracting device for moving the lock release mechanism to the set position and to the reset position at the time of inserting and extracting the connector.

The second aspect of the present invention provides a locking and unlocking mechanism for locking and unlocking the connector comprising a cable holding member for holding an end of a cable and a lock release member slidably attached to the outside of the cable holding member, to the housing for receiving said connector and for conducting the cable; wherein the lock and unlock mechanism comprises: in the connector, an engaging pawl provided in the cable holding member; in the connector, a protrusion on the beam portion extended from the lock-release member extending towards the housing; and in the housing, an engaging portion provided in an elastic beam portion, in which one side is opened for receiving said beam portion, provided with an engaging portion for engaging with said engaging pawl and a notch for receiving said protrusion; an automatic retracting device, in which, when the connector is inserted, the lock release member is moved to a set position where the protrusion of the lock release mechanism is received by the notch portion in the elastic, and when the connector is extracted, the lock release mechanism is moved to the reset position with respect to the cable holding member; wherein, the connector is connected to the housing by adjusting the engaging pawl of the lock release mechanism of the connector to the engaging portion of the housing by pushing up the elastic beam portion of the housing by means of the protrusion of the lock release mechanism of the connector and by moving the lock release member to the set position through the automatic retracting device.

According to the third aspect of the present invention, in a locking and unlocking mechanism according to the first aspect, said automatic retracting device comprises an elastic body provided between a cable holding member and the lock release member, pressed at the time of inserting the connector.

According to the fourth aspect, in the locking and unlocking mechanism according to the second aspect, said cable holding member comprises a pushing portion for applying a pushing force to said lock release member, and said automatic retracting device comprises a forward descending inclined plane provided with said pushing portion, and at the time of inserting the connector, the beam portion is bent toward the elastic beam portion by pushing the beam portion of the lock release portion through said inclined plane.

According to the fifth aspect, there is provided a locking and unlocking mechanism for locking and unlocking the connector comprising a cable holding member for holding an end of a cable and a lock release member slidably attached to the outside of the cable holding member, to the housing for receiving said connector and for conducting the cable; wherein the lock and unlock mechanism comprises: in the connector, an engaging pawl provided in the cable holding member; in the connector, a protrusion on the beam portion extended from the lock release member extending towards the housing; in the housing, an engaging portion provided in an elastic beam portion, in which one side is opened for receiving said beam portion, provided with a engaging portion for engaging with said engaging pawl and a notch for receiving said protrusion as well as a guide portion for guiding the distal end of the beam portion; and the automatic retracting device, provided between the cable holding member and the lock release member, after the connector is extracted, for moving the lock release member to a set position where a top end of the beam portion is made flat, and when the connector is extracted, the connector is separated from the housing by releasing the engagement between the engaging pawl with the engaging portion by pushing up the elastic beam portion of the housing by bending the beam portion, and by moving the lock release member to the reset position by said automatic retracting device.

According to the sixth aspect, in the locking and unlocking mechanism according to the fifth aspect, said automatic retracting device comprises a forward descending inclined plane provided on one of the receiving portion and the engaging pawl and an abutting portion for abutting to said inclined plane, and, at the time of extracting the connector, said inclined plane and said abutting portion bend the beam portion of the lock release mechanism toward the elastic beam portion.

According to the seventh aspect, in the locking and unlocking mechanism according to the fifth aspect, said lock release member comprises an engaging portion for receiving said engaging pawl and said automatic retracting device comprises an inner downward periphery of said engaging portion and a top end pushing portion for pushing said periphery, and the top end pushing portion of the engaging pawl and said internal periphery make the beam portion of the lock release member bend towards the opposite side of the elastic beam member.

According to the eighth aspect, in the locking and unlocking mechanism according to the first aspect, said lock release member comprises a gripping portion for extracting the connector.

The ninth aspect provides a method for locking and unlocking a cable connector comprising a connector for holding an end of a cable and a lock release member slidably attached to the outside of the cable holding member and a housing for receiving said connector and conducting the cable, and a method of unlocking the cable connector is carried out by sliding the lock release member of the connector fitted in the housing from the set position to the release position, wherein the method comprises: fitting the connector into the housing, at the time of inserting the connector, by the steps of: inserting the cable gripping the cable holding member into the housing, pushing up the elastic beam portion by a part of the lock release member, engaging the engaging portion of the elastic beam portion with the engaging pawl of the cable holding member, and by moving the lock release member to the set position by the elastic energy of the elastically deformed lock release member by being pushed by the cable holding member; and disconnecting the connector from the housing, at the time of extracting the connector, by the steps of: extracting the lock release member, pushing up the elastic beam portion for releasing the engagement between the engaging portion of the elastic beam portion and the engaging pawl of the cable holding member and moving the lock release member to the reset position by the elastic energy of the lock release member by the elastic energy of the lock release member caused by the elastic deformation after the connector is extracted.

DETAILED DESCRIPTION OF THE INVENTION

Figure 1:
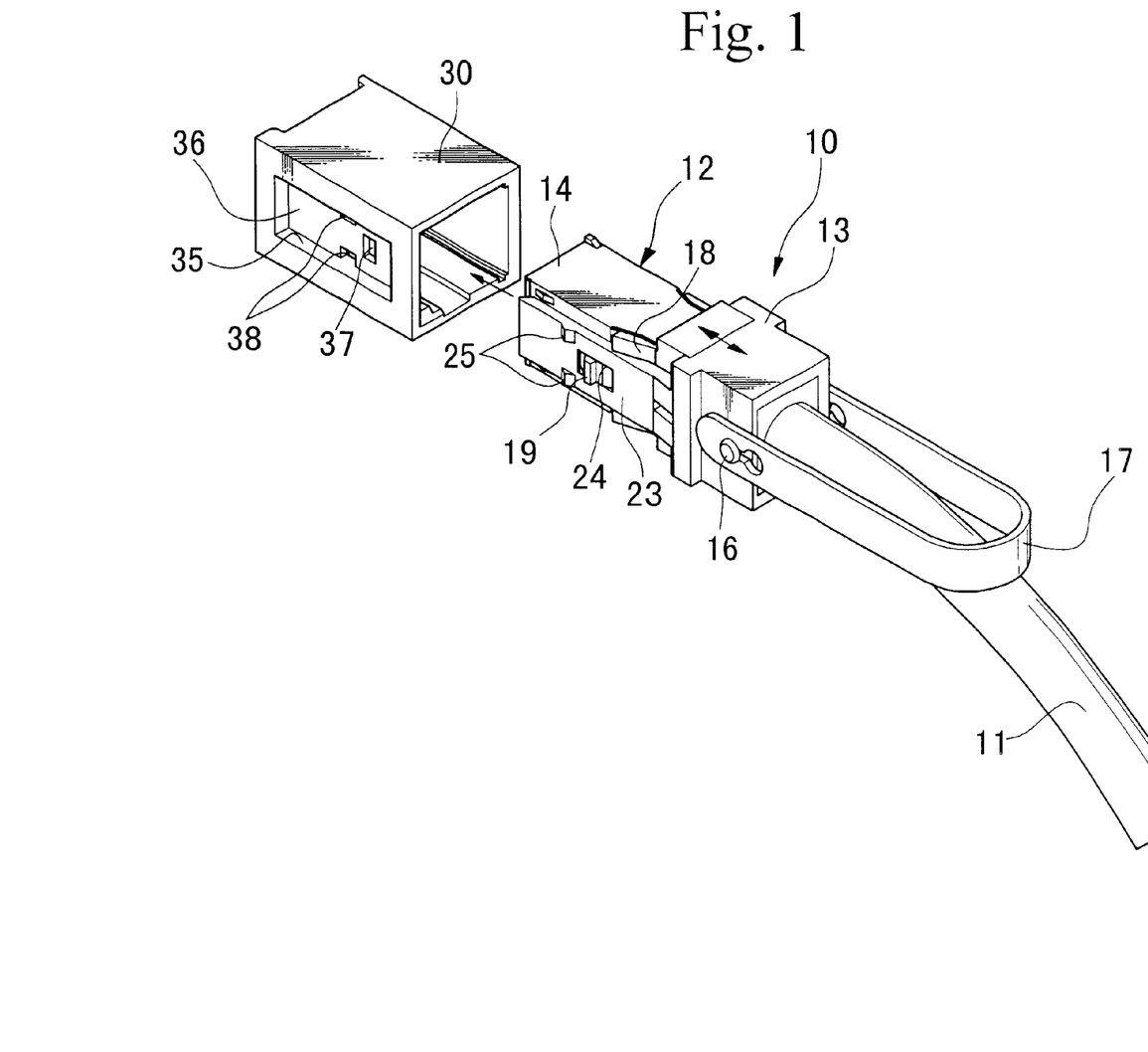
FIG. 1 is a perspective view as a whole showing the first embodiment of the present invention.
Figure 2:
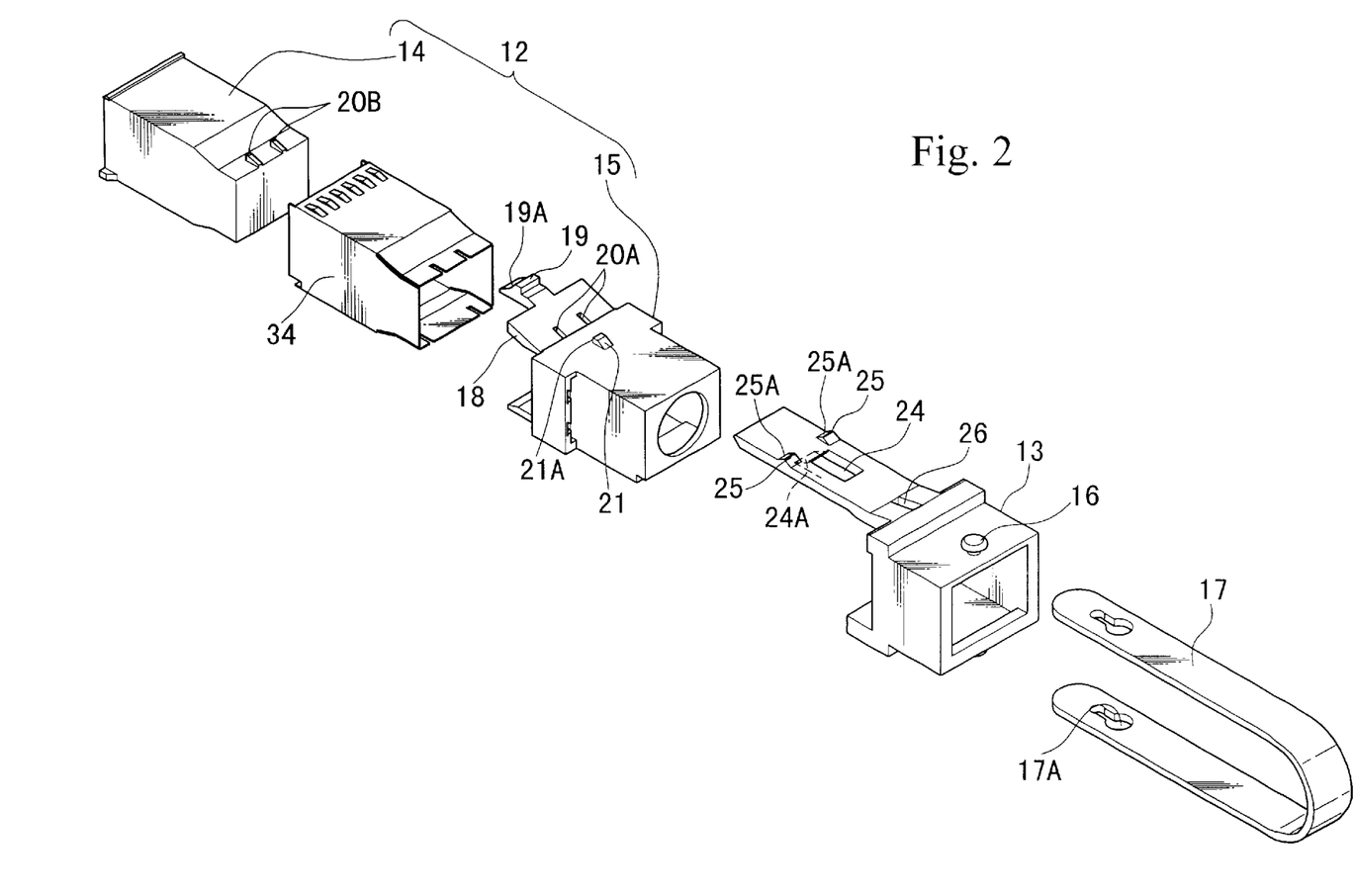
FIG. 2 is an exploded view showing the main portion of the first embodiment of the present invention.
Figure 3:
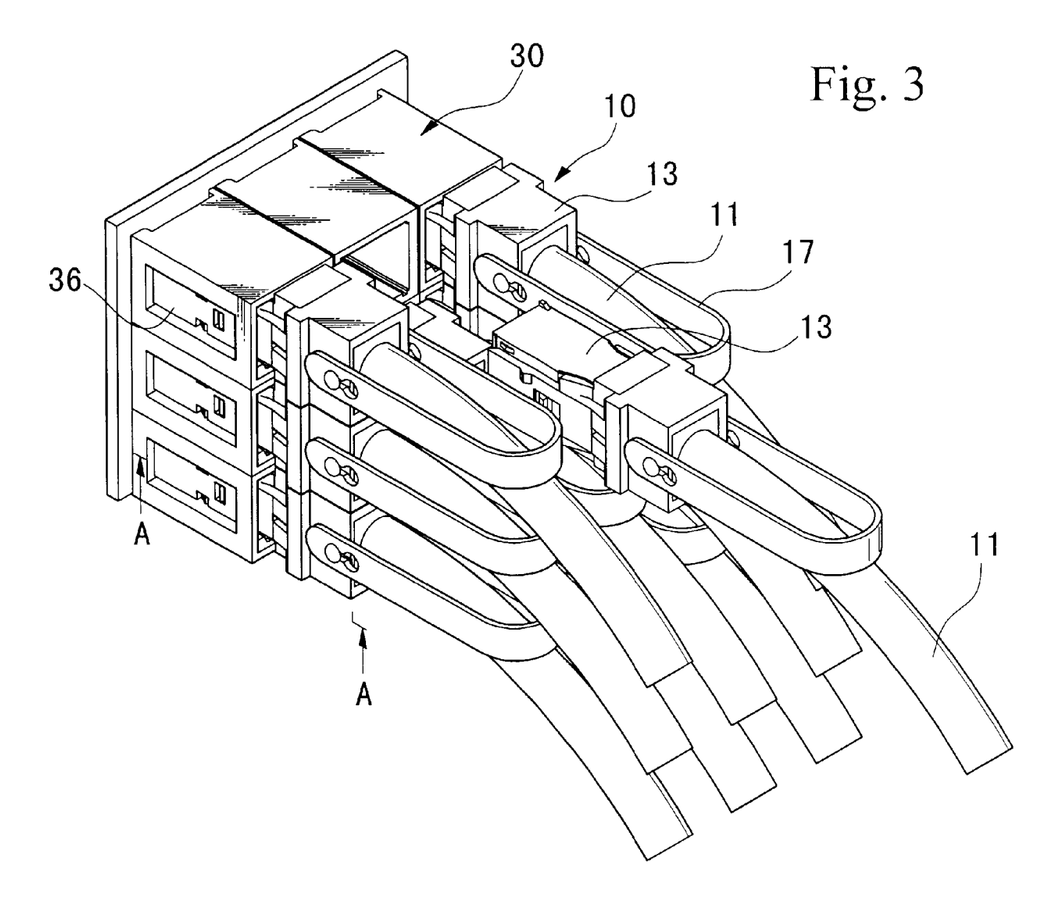
FIG. 3 is a perspective view showing an example of the first embodiment of the present invention.

Hereinafter, the first embodiment of the present invention is described with reference to the attached drawings. In FIG. 1, which shows a perspective view of the first embodiment as a whole of the present invention, the numeral 10 denotes a connector, and the connector 10 comprises a cable holding member 4 for holding an end of the cable 11 and a lock release member 13 slidably installed at the outside of the cable holding member 12. In FIG. 2, showing an exploded view of the main portion of the first embodiment, the cable holding member 12 of the connector 10 comprises a connector body 14 for holding the cable and a cover portion 15, being attached so as to cover the connector body 15, and this cover body 15 is configured so as to be combined with the lock release member 13.

The lock release member 13 comprises a hook 16 and an extracting tab 17 (a gripping portion) is to be fitted to the hook 16. An extended portion 18 is provided with the above-described cover portion 15 and an engaging pawl 19 having a downward inclined plane is provided at the top end of this extended portion 18, and a slit portion 20A for engaging with the protruded portion 20B is formed at the base end of the cover portion 15. A holding pawl 21 (a pushing portion), capable of engaging with the lock release member 13, is provided on the upper surface of the cover portion 15 at the side where the extended portion 18 is provided. Here, the holding pawl 21 is configured with the vertical front surface directed ahead.

The lock release member 13, as installed in the cover portion 15, can be slidably fitted to the cable holding member 12 in the inserting direction of the cable into the connector and the lock release member 13 comprises a box portion 22, into which the cable 11 can be inserted, and a plate-like beam portion 23 extended from a side edge of an opening of the box portion 22. The beam portion 23 can be deformed by bending upward shown in FIG. 2. At the center portion of the beam portion 23, a receiving hole 24 for receiving the engaging pawl 19 of the cover portion 15 is formed. In addition, at a top end portion of the beam portion close to the inserting end, a pair of triangular protrusions 25 having slopes on the fore and after sides are provided.

Here, the engaging hole 24 has a thickness such that the engaging pawl 19 sticks out of the engaging hole 24. A hole 26 capable of engaging with the holding pawl 21 of the cover portion 15 is formed at the base end of the beam portion 23. The inside surfaces of the engaging hole 24 are formed by inclined planes 24A so as to fit the inclined planes 24A of the engaging hole to the inclined planes 19A of the engaging pawl 19. Either one of inclined hole surfaces 24A or one of inclined hole surfaces 19A constitutes the abutting surface.

Figure 4:
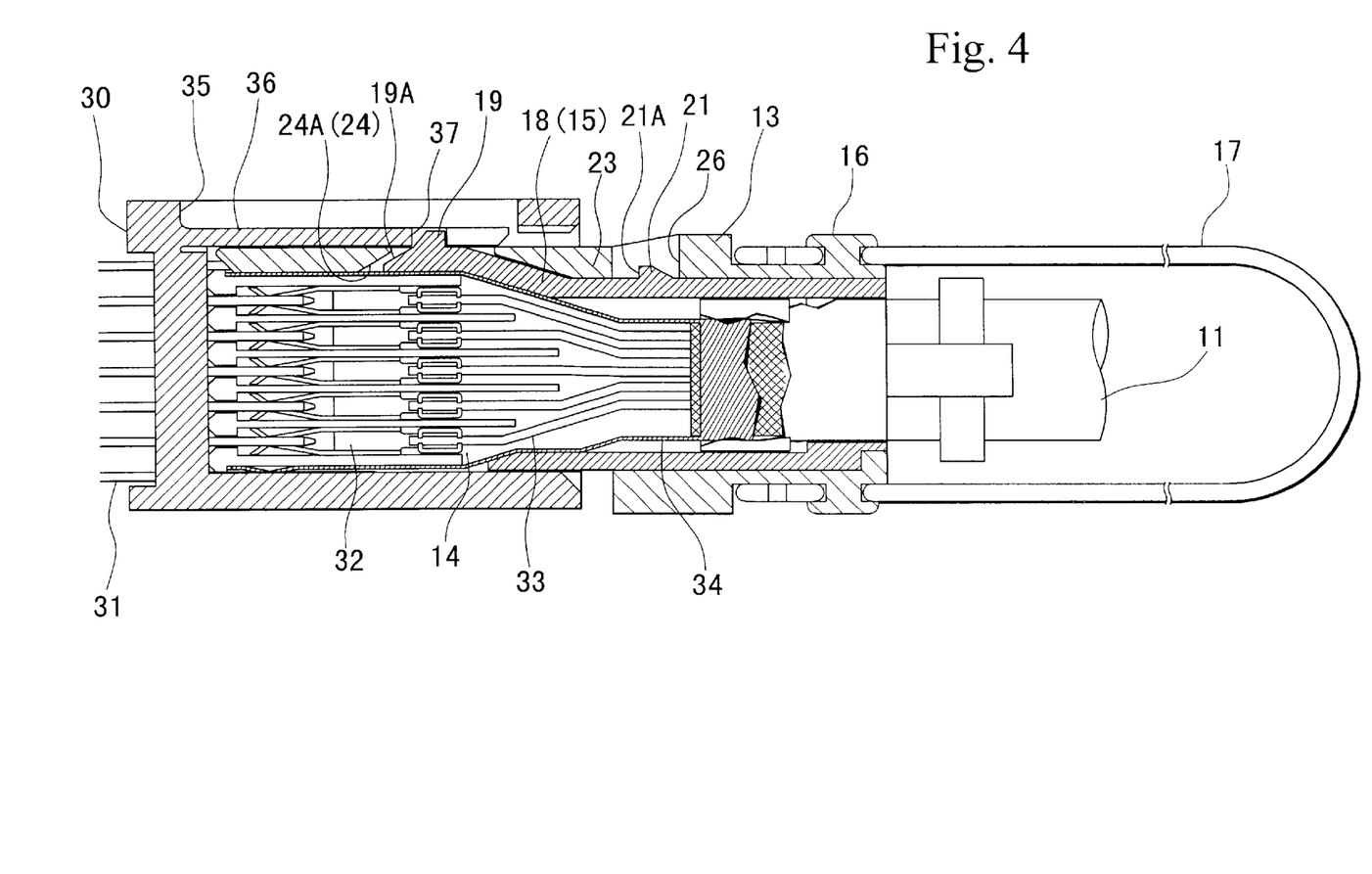
FIG. 4 is a cross-sectional view along A—A line of FIG. 3.

The numeral 30 in FIG. 1 denotes a housing. This housing 30 is a quadrangular box-type member for receiving the connector 10. As shown in FIG. 4, the housing 30 is used for connecting the male terminals 31 inserted through the bottom plate of the housing 30 with the cables 11 through the contacts 32 installed in the connector body 14. Here, the numeral 34 in FIG. 4 denotes a shield for covering the connector body 14 and the numeral 33 in FIG. 4 denotes a core wire. The housing 30 comprises a recessed portion 35 formed on one side of the housing which corresponds to the beam portion 23 of the lock release member 13, and an elastic beam portion 36 is provided at the bottom wall portion of this recessed portion 35. This recessed portion 35 eliminates the elastic beam portion from protruding outside of the housing 30 due to deformation of the elastic beam portion 36, which is described later, for preventing the interference to the adjacent housings 30.

The above-described elastic beam portion 36 is formed in the form of a cantilever extending from one side of the opening of the housing 30 and, on the elastic beam portion, an engaging hole 37 (the engaging portion) is formed at a position corresponding to the engaging pawl 19 of the cover portion 15, which protrudes from the receiving hole 24 of the lock release member 35. Notches 38 and 38 are formed for receiving the protrusions 25 and 25 of the lock release member 13 in the elastic beam portion 36 at a position closer to the base end of the beam portion than the engaging hole 37.

Figure 5A:
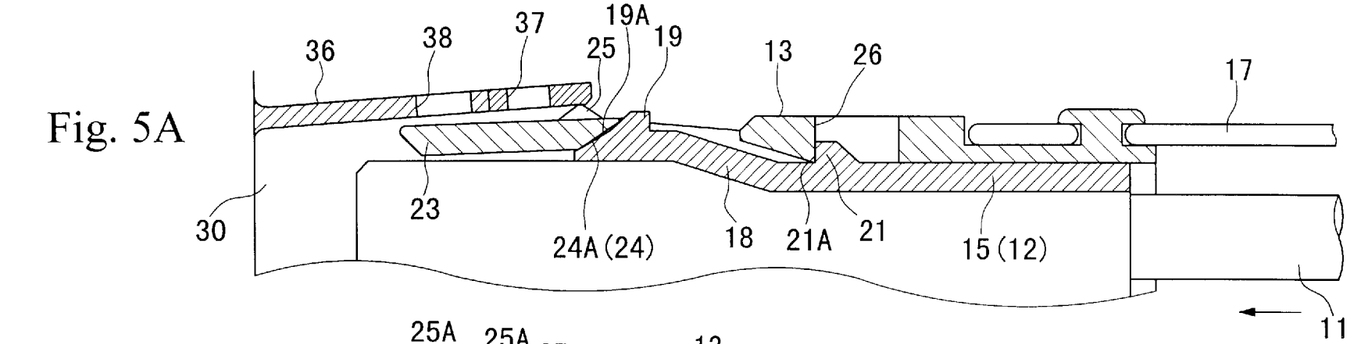
FIGS. 5A, 5B, and 5C are diagrams showing inserting states into the connector according to the first embodiment of the present invention.
Figure 5B:
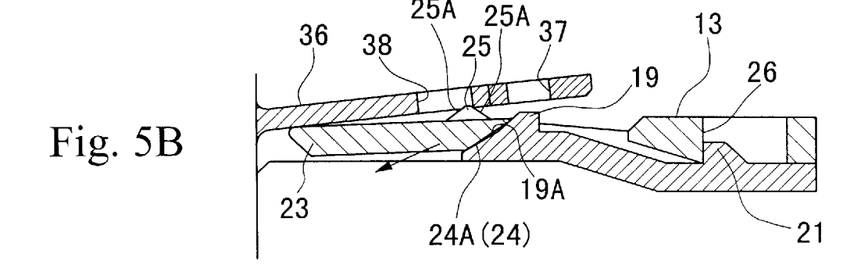

As shown in FIG. 5A, the beam portion 23 is constructed such that, when the holding pawl 21 of the cover portion 15 pushes the front surface of the hole 26, the inclined plane 24A of the receiving hole 24 rides on the inclined plane 19A of the engaging pawl 19 for pushing the beam portion in the upward direction. The protrusions 25 of the beam portion 23 have a height such that engagement between the engaging pawl 19 and the engaging hole 37 can be released by extracting the lock release member 13 for pushing up the elastic beam portion 36 while the beam portion 23 is retracting for the housing 30 through the holding pawl 21. As shown in FIG. 5B, the protrusion 25 is formed at a position where the protrusion 25 operates so as to draw the beam portion 23 by the reactive force of the elastic beam portion 36 by abutting the inclined plane 25A of the protrusions 25 to the back end of the notch 38. The combination of the elastically deformable beam portion 23 of the lock release member 13, the receiving hole 24, the inclined plane 24A, the engaging pawl 19 and the inclined plane 19A constitutes an automatic retracting device.

According to the above-described embodiment, when the connector 10 according to this embodiment is applied, for example, to a telephone exchanger, the connector 10 must be inserted in a densely mounted array of connectors, which results in disturbing the normal operation of inserting the connector manually by gripping the lock release mechanism due to the adjacent lock release members. Under such circumstances, the connector 10 is installed into the housing 30 by gripping the cable 11, which may ensure the reliable locking.

That is, as shown in FIG. 5a, when the connector is inserted into the housing by gripping the cable 11, the front surface 21A of the holding pawl 21 in the cable holding member 12 (the cover portion 15) pushes the hole portion 26 of the lock release portion 13 and the lock release member 13 moves toward the inserting direction of the connector 10. The protrusion 25 of the moving lock release member 12 pushes up the elastic beam portion 36, which allows entering of the engaging pawl.

When the engaging pawl 19 of the cable holding member 12 is inserted and reaches the position where the engaging pawl 19 can engage with the engaging hole 37 of the elastic beam portion 36, the protrusion 25 is settled in the notch 28 smoothly, and, in some cases, the engaging pawl 19 engages with the engaging hole 37. In some other cases, as shown in FIG. 5B, the protrusions 25 of the lock release member 13 are caught by the edge of the elastic beam portion 36.

In the state shown in FIG. 5B, when the inclined plane 19A of the engaging pawl 19 rides on the inclined plane 24A of the receiving hole 24 because the front surface 21A of the engaging pawl 21 pushes the hole 26 of the lock release member 13, the beam portion 23 is deformed by bending toward the elastic beam portion 36. Then, the lock release member 13 moves towards the set position as indicated by the arrow shown in FIG. 5B, by the elastic energy of the beam portion 23 of the lock release member 13. In addition, since the inclined plane 25A of the protrusion 25 is subjected to the elastic force from the edge of the notch 38, this elastic force also moves the lock release member 13 to the set position.

Figure 5C:
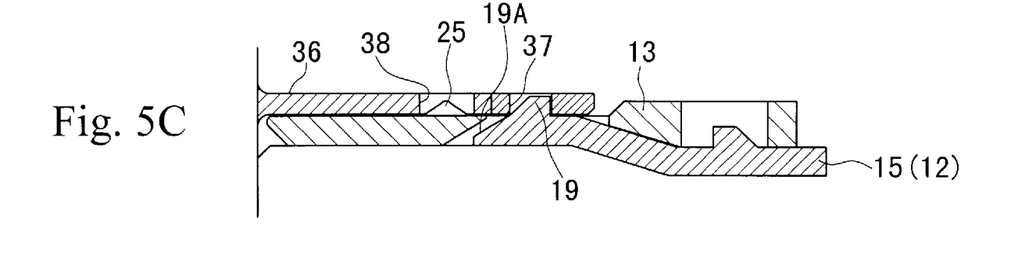

Therefore, as shown in FIG. 5C, the protrusions 25 of the lock release member 13 and the engaging pawl 19 of the cable holding member are automatically settled in the notches 38 and the engaging holes 37 of the elastic beam portion 36 for settling the lock release member 13 in the set position, so that the connector 10 is reliably locked in the housing.

Accordingly, since the connector 10 can be locked in the housing 30 by pushing the cable 11 into the housing 30, the connector 10 can be reliably locked into the housing by one action, even in the case of mounting in a housing located in a densely mounted array of housings 30.

Figures 6A, 6B:
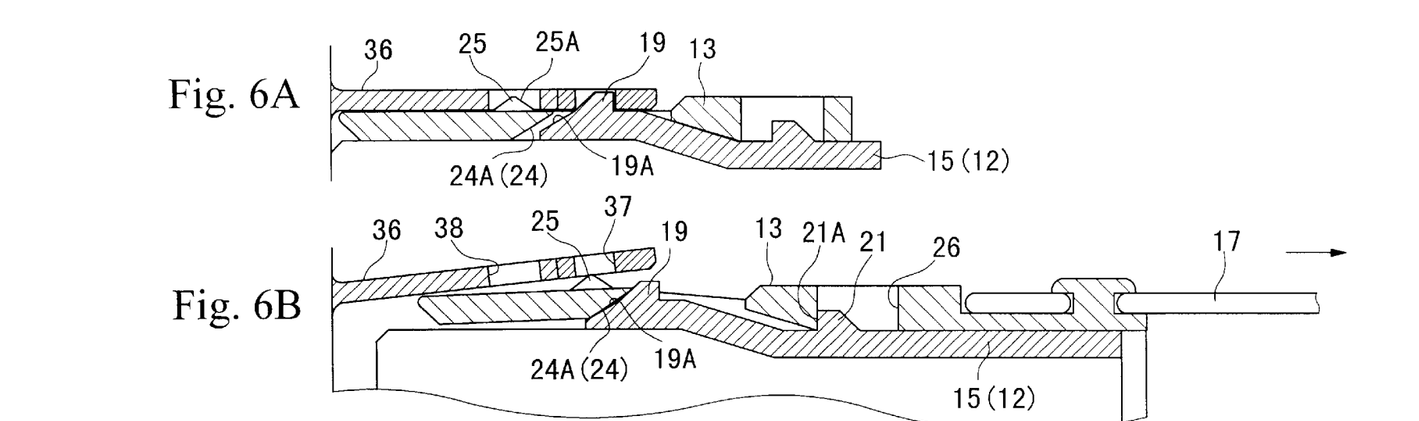
FIGS. 6A to 6D are diagrams showing extracting states from the connector according to the first embodiment of the present invention.
Figure 6C:
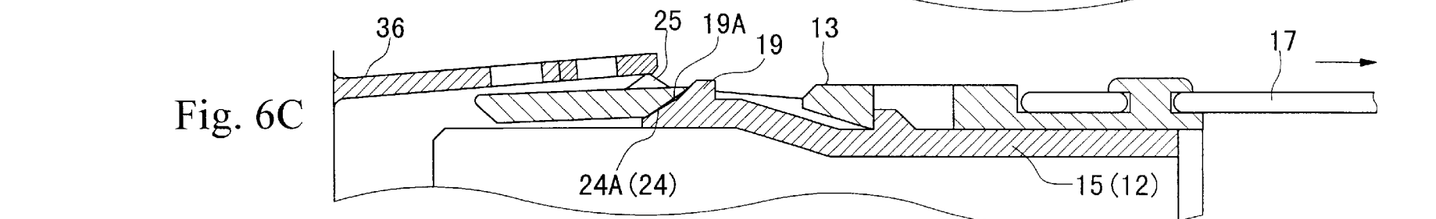
Figure 6D:
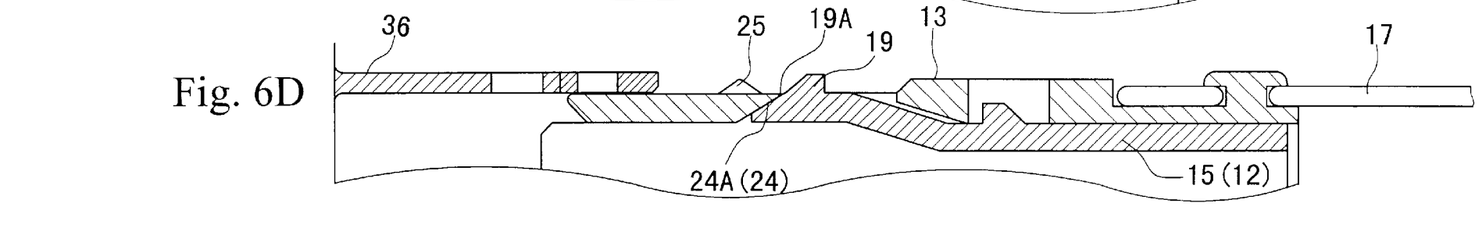

In contrast, when the connector 10 is removed from the housing, the connector 10 can be removed from the housing 30 by first pulling the extracting tab 17, and the lock release member 13 at the set position, as shown in FIG. 6A, pushes up the elastic beam portion 36 by means of the inclined plane 25A of the protrusion 25, the engaging pawl 19 is taken off from the engaging hole 37, and when the hole 26 of the lock release member 13 is caught by the front surface 21A of the engaging pawl 21 of the cover portion 15 from th eposition shown in FIG. 6B, the cable holding member 12 (the cover portion) start moving, and when the protrusion 25 of the lock release member 13 is taken off from the elastic beam portion 36, as shown in FIG. 6C, the connector 10 is separated from the housing. As shown in FIG. 6D, after the connector 10 is separated, since the beam portion 23, which has been subjected to the elastic deformation, returns to the flat state, the lock release member 13 moves to the proper and reset position for the cable holding member 13.

Therefore, the connector 10 can be surely removed off by the use of the extracting tab by one action. Thus, even if the housings 30 are densely mounted, the cable can be removed easily without gripping the lock release member 13.

Figure 7A:
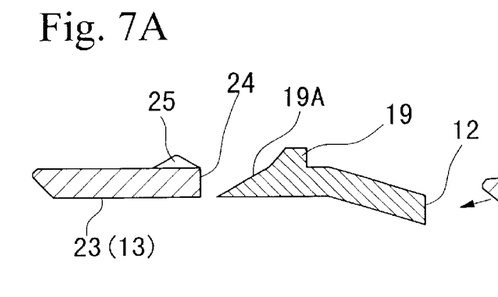
FIGS. 7A and 7B are cross-sectional views showing the second embodiment of the present invention, wherein 7A shows the set position and 7B shows the state in which the engaging pawl is raised.
Figure 7B:
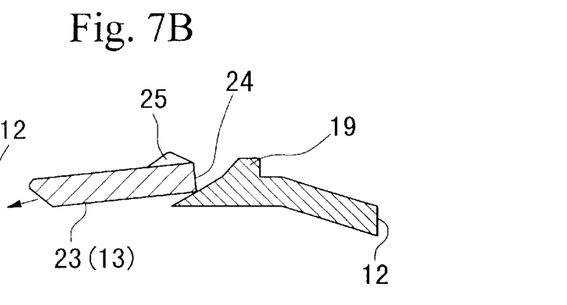
Figure 8A:
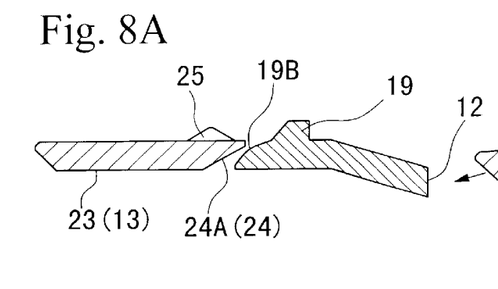
FIGS. 8A and 8B are diagrams showing another example of the second embodiment of the present invention, wherein 8A shows the set position and 8B shows the state in which the engaging pawl is raised.
Figure 8B:
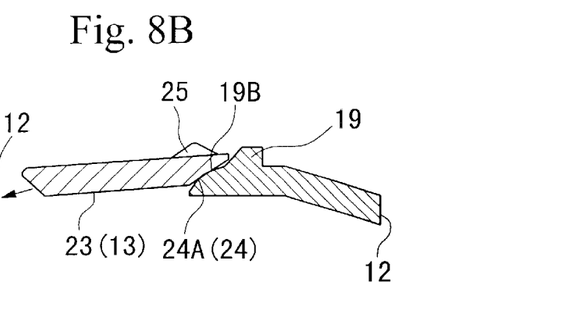
Figure 9A:
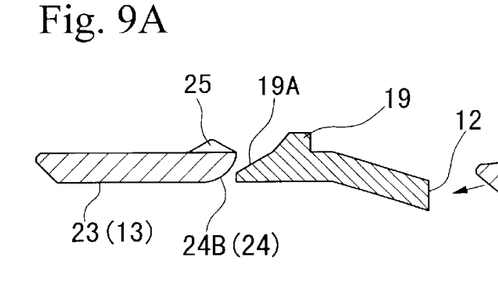
FIGS. 9A and 9B are diagrams showing another example of the second embodiment of the present invention, wherein 9A shows the set position and 8B shows the state in which the engaging pawl is raised.
Figure 9B:
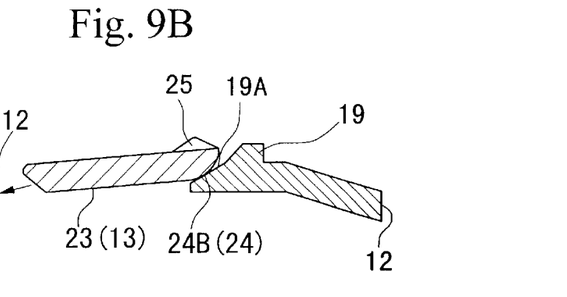

Next, the second embodiment of the present invention is described with reference to FIGS. 7 to 9. FIG. 7 is a diagram showing the structure of the second embodiment of the present invention. The particular features of the second embodiment are related to the engaging pawl 19 of the cable holding member 12 and the receiving hole 24 in the beam portion 23 of the lock release member 13, which constitutes the above mentioned automatic retracting device. The second embodiment differs from the first embodiment in that the inclined plane is not provided, as shown in FIG. 7, and that the inclined plane 19A of the engaging pawl 19 is substituted by an arcuate slope 19B as shown in FIG. 8, and that the inclined plane 24A of the receiving hole 24 is substituted by an arcuate slope 24B as shown in FIG. 9. Here, in FIGS. 7 to 9, 7A to 9A show the relative position of respective components, and 7B to 9B illustrate each state when the engaging pawl 19 is riding on the receiving hole. The same effect is obtained when the relation between the engaging pawl and the engaging hole is reversed.

Thus, in any of the above-described embodiments, since the beam portion 23 of the lock release member 13 can be bent by configuring the engaging pawl 19 riding on the receiving hole 24, the lock release member 13 can be surely moved to the set position in the final phase of inserting the connector 10. The other constitutions of this embodiment are the same, so that their explanations are omitted (the same holds for the following embodiments).

Figure 10A:
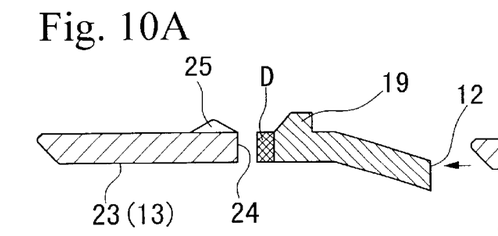
FIGS. 10A and 10B are diagrams showing the third embodiment of the present invention, wherein 10A shows the set position and 10B shows the state in which there is pressure by the engaging pawl.
Figure 10B:
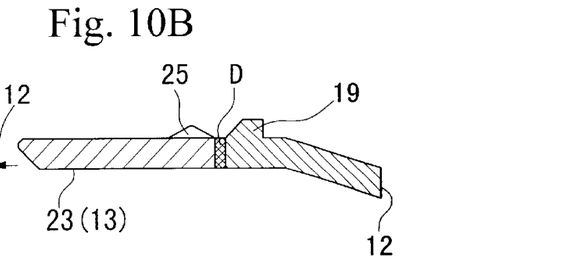

The third embodiment shown in FIGS. 10A and 10B has the particular configuration that an elastic body is inserted in between the engaging pawl 19 of the cable holding member 12 and the receiving hole 24 in the beam portion 13 of the lock release member 13, which constitute the automatic retracting device. Practically, the top end of the engaging pawl 16 is formed into a flat surface and a elastic body D such as a rubber body is attached to the flat surface. When the engaging pawl 19 is pushed, the elastic body D is compressed between the engaging pawl 19 and the receiving hole 24 (FIG. 10B) and, by using the elastic energy accumulated in the elastic body, the lock release member 13 is moved to the set position at the final inserting stage of the connector. It is noted that the above elastic body D may be attached to the receiving hole 24.

Figure 11A:
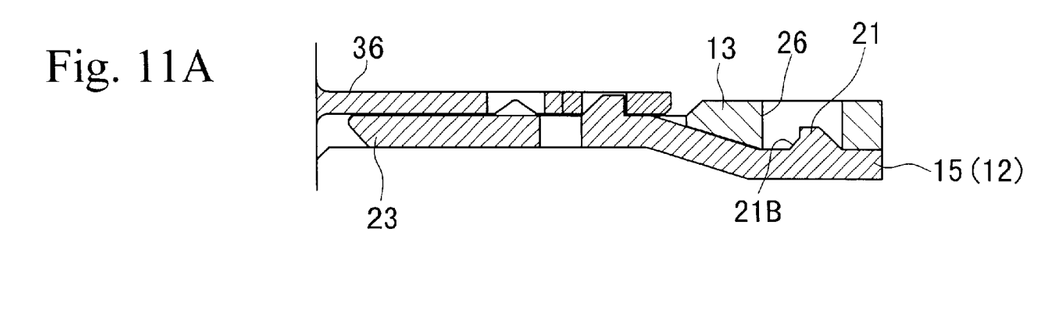
FIGS. 11A and 11B are diagrams showing the fourth embodiment of the present invention, wherein 11A shows the set position and 11B shows the state in which the elastic beam portion is raised.
Figure 11B:
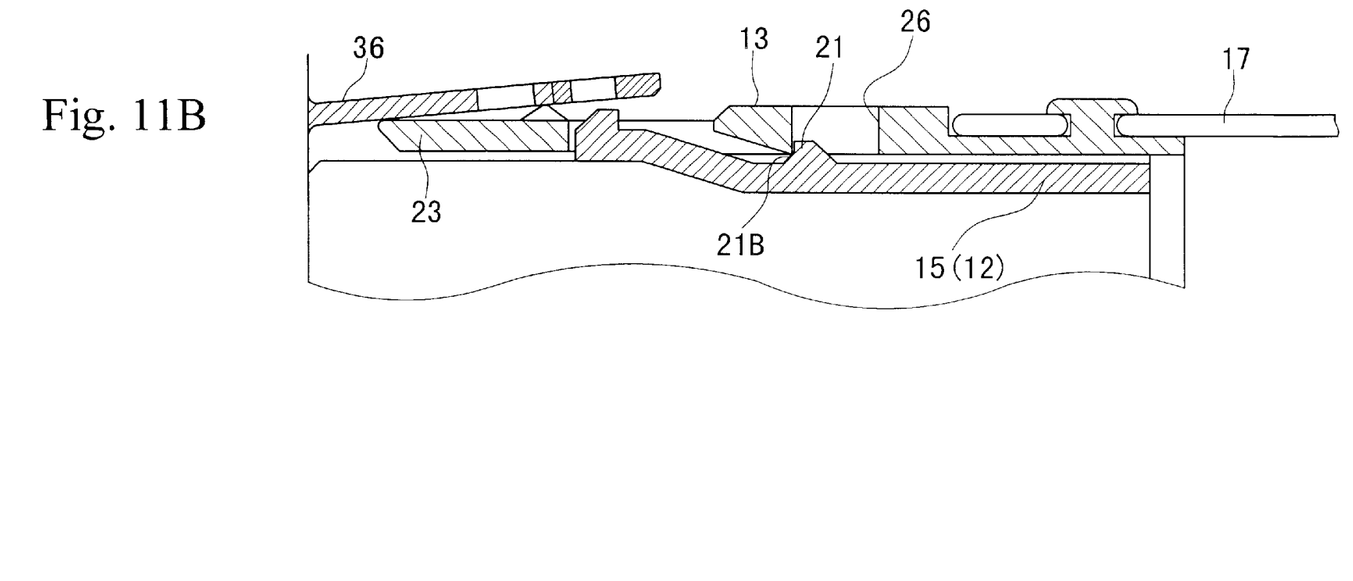

Next, the fourth embodiment of the present invention is described with reference to FIGS. 11A and 11B. FIG. 11A is a diagram for explaining the state in which the lock release member 13 is in the set position and FIG. 11B is a diagram for explaining the state in which the connector is inserted. In this embodiment, the holding pawl 21 on the cover portion 15 of the cable holding member 12 comprises an forward inclined plan e 21B for pushing the hole 26 of the lock release member 13, and the forward inclined plane 21B constitutes the main portion of the automatic retracting device. At the time of inserting the connector 19, the beam portion 23 is bent towards the elastic beam portion by pushing the beam portion 23 of the lock release member 13 through this inclined plane 21B. Accordingly, the lock release member 13 can be moved to the set position even at the final stage of the insertion of the connector 10.

Figure 12A:
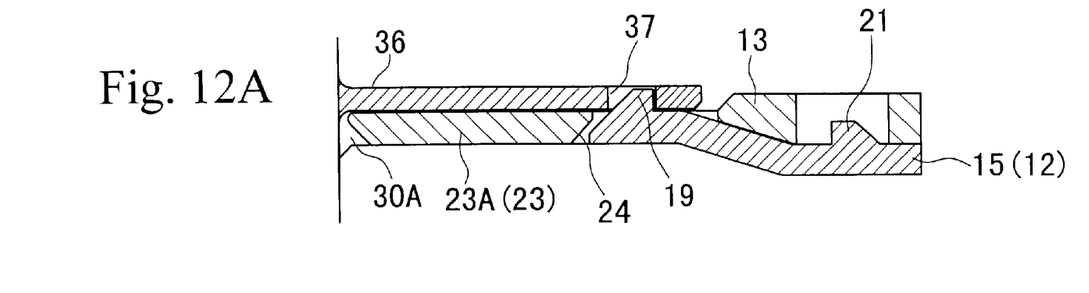
FIGS. 12A and 12B are diagrams showing the fifth embodiment of the present invention, wherein 12A shows the set position and 12B shows the state in which the elastic beam portion is raised.
Figure 12B:
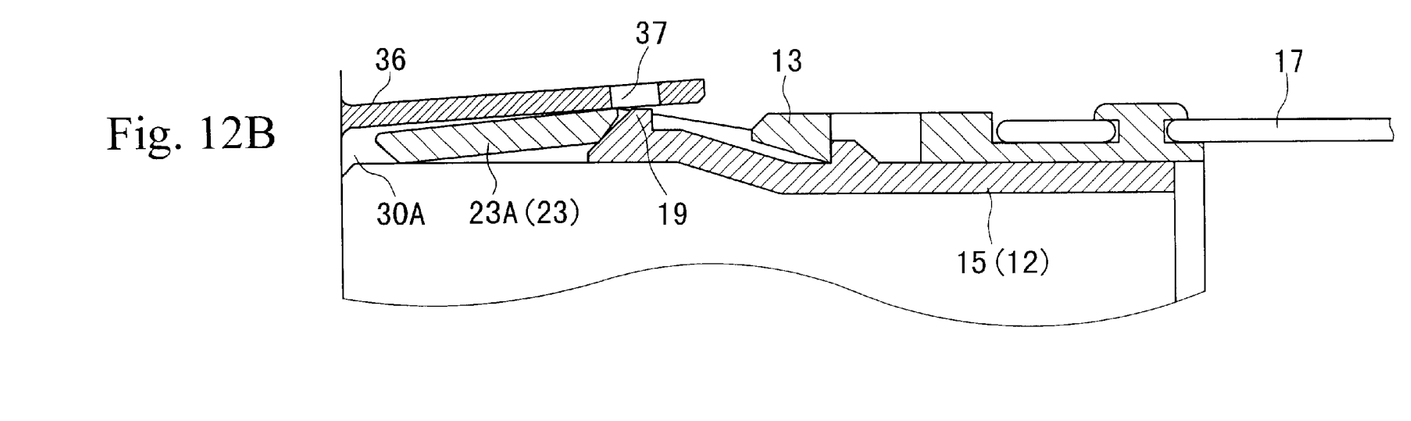

The fifth embodiment of the present invention is shown in FIGS. 12A and 12B. FIG. 12A is a diagram showing that the lock release member 13 is at the set position, and FIG. 12B is a diagram showing that the connector is being extracted.

In this embodiment, the protrusion 25 of the lock release member 13, which is used in the first embodiment, is disused and the beam portion 23 of the lock release member 13 is made more flexible such that, instead of the protrusions 25 in the first embodiment, the elastic beam portion 36 is pushed up at the time of extracting the connector 10 by the distal end 23A near the receiving hole 24 of the beam portion 23 bent towards the elastic beam portion 36.

In this embodiment, the automatic retracting device operates at the time of extracting the connector (the same as the first embodiment shown in FIG. 13), and the main portion of the automatic retracting device is comprised of the beam portion 23 of the lock release member 13, which is now made flexible. At the time of extracting the connector 10, the lock release member 13 can be moved to the reset position where the distal end 23A of the beam portion 23 reaches the same level as that of the lock release member 13. Accordingly, in this embodiment, the lock release member 13 can be surely moved to the reset position after the connector has been extracted. In addition, the lack of the protrusion 25 allows manufacturing of this mechanism at a reduced cost. Here, in the interior of the housing 30, a guide portion 30A is provided for guiding the distal end 23A of the beam portion 23.

Figure 13A:
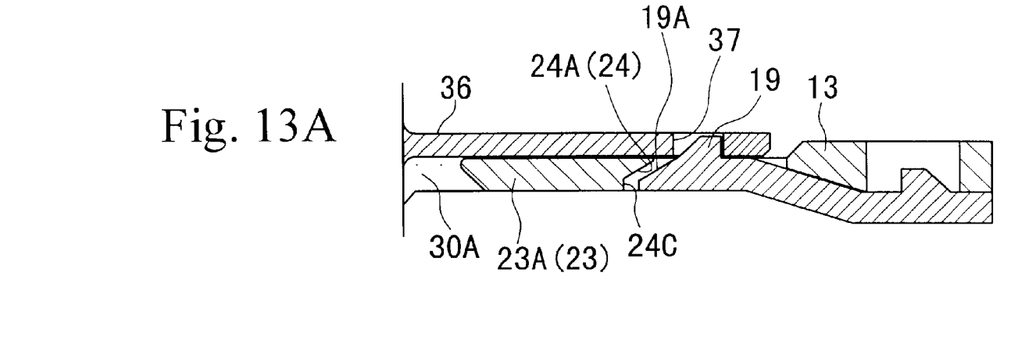
FIGS. 13A and 13B are diagrams showing the sixth embodiment of the present invention, wherein 13A shows the set position and 13B shows the state in which the elastic beam portion is raised.
Figure 13B:
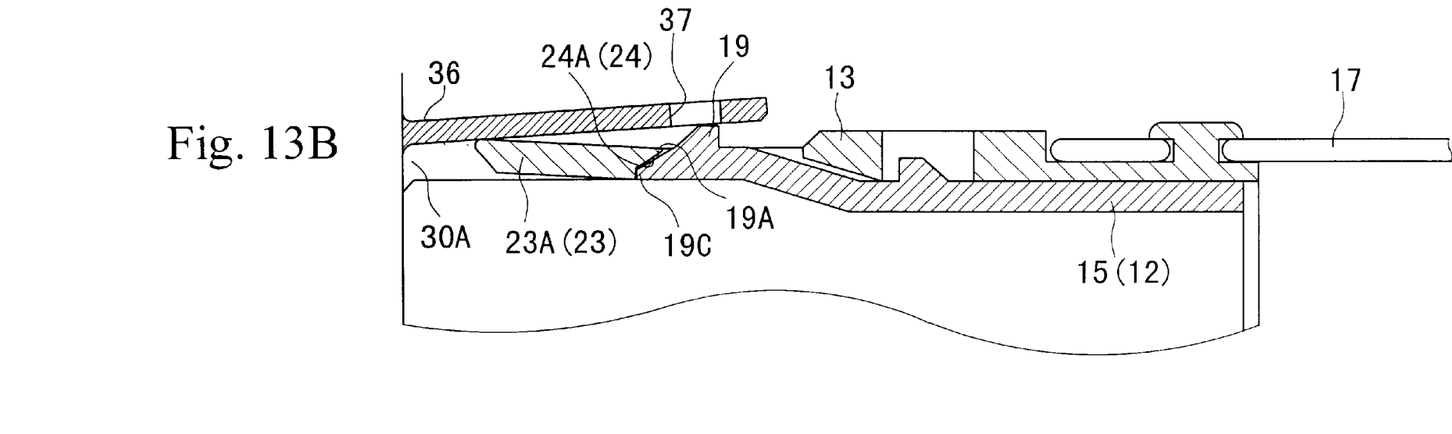

FIGS. 13A and 13B show the sixth embodiment of the present invention. FIG. 13A shows the lock release member 13 in the set position, and FIG. 13B is a diagram explaining the extraction of the connector 10. In this embodiment, the protrusions 25 used in the first embodiment are absent and the beam portion 23 of the lock release member 13 is made flexible, such that, at the time of extracting the connector, the elastic beam portion 36 is pushed up by the distal end 23A of the beam portion 23 bent towards the elastic beam portion 36, instead of by the protrusions 25 in the first embodiment.

In this embodiment, the automatic retracting device is composed of the inside downward periphery 24C of the inserting side of the receiving hole 24 for receiving the engaging pawl 19 and a top end pushing portion 19C of the engaging pawl 19, and the top end pushing portion 19C of the engaging pawl 19 and the above-described inside downward periphery 24C allows the distal end portion 23A of the beam portion 23 of the lock release member 13 bending toward the opposite side of the elastic beam portion 36. The inclination of the inclined plane 24A of the receiving hole 24 is made larger than the inclined plane 19A of the engaging pawl 19 in order for both the inclined plane 24A of the receiving hole 24 and the inclined plane 19A of the engaging pawl 19 to allow bending of the above distal end 23 A. In addition, the present embodiment comprises, similar to the previous embodiment, the guide portion 30A for guiding the distal end 23A of the beam portion 23 inside of the housing 30.

Therefore, at the time of extracting the connector 10, the lock release member 13 can be moved to the reset position where the distal end portion 23A of the beam portion is made flat with the lock release member 13. Accordingly, in this embodiment, the lock release member 13 can be reliably retracted to the predetermined position after the connector 10 is extracted. In addition, it is also possible in this embodiment to manufacture the mechanism at a reduced cost.

What is claimed is:

1. A locking and unlocking mechanism for locking and unlocking a connector, comprising a cable holding member for holding an end of a cable and a lock release member slidably attached to the outside of the cable holding member, to a housing for receiving said connector and for conducting the cable;

wherein, at the time of inserting the connector, a pushing operation of the lock release member allows connection of the lock release member to the housing by setting the lock release member at a set position by engaging of an engaging pawl provided with one of the cable holding member or the lock release member with an engaging portion provided with the other one of the cable holding member and the lock release member by pushing up an elastic beam portion provided in one of the cable holding member and the lock release member by means of an inclined plane provided with the other one of the cable holding member and the lock release member, wherein pushing up of the elastic beam portion causes the storage of elastic energy;

at the time of extracting the connector, the connector is released from the housing by sliding the lock release member in a releasing direction for pushing up the elastic beam portion by a protrusion; and the lock and unlock mechanism configured to enable the stored elastic energy to automatically move the lock release mechanism to the set position and to the reset position at the time of inserting and extracting the connector.

2. A locking and unlocking mechanism for locking and unlocking a connector, comprising a cable holding member for holding an end of a cable and a lock release member slidably attached to the outside of the cable holding member, to a housing for receiving said connector and for conducting the cable;

wherein the lock and unlock mechanism comprises:
in the connector, an engaging pawl provided in the cable holding member;
in the connector, a protrusion on a beam portion extended from the lock release member extending towards the housing;
in the housing, an engaging portion provided in an elastic beam portion, in which one side is opened for receiving said beam portion, provided with the engaging portion for engaging with said engaging pawl and a notch portion for receiving said protrusion;
wherein, when the connector is inserted, the lock release member is moved to a set position where the protrusion of the lock release mechanism is received by the notch portion in the elastic beam portion, and when the connector is extracted, the lock release mechanism is moved to the reset position with respect to the cable holding member;
wherein, the connector is connected to the housing by adjusting the engaging pawl of the lock release mechanism of the connector to the engaging portion of the housing by pushing up the elastic beam portion of the housing by means of the protrusion of the lock release mechanism of the connector, thereby storing elastic energy, and by moving the lock release member to the set position automatically using the elastic energy stored in the elastic beam portion.

3. A locking and unlocking mechanism according to claim 1, wherein said automatic retracting device comprises an elastic body provided between a cable holding member and the lock release member, pressed at the time of inserting the connector.

4. A locking and unlocking mechanism according to claim 2, wherein said cable holding member comprises a pushing portion for applying a pushing force to said lock release member, and said engaging pawl comprises a forward descending inclined plane provided with said pushing portion, and at the time of inserting the connector, the beam portion is bent toward the elastic beam portion by pushing the beam portion of the lock release portion by said inclined plane.

5. A locking and unlocking mechanism for locking and unlocking a connector, comprising a cable holding member for holding an end of a cable and a lock release member slidably attached to the outside of the cable holding member, to a housing for receiving said connector and for conducting the cable;

wherein the lock and unlock mechanism comprises:
in the connector, an engaging pawl provided in the cable holding member;
in the connector, a protrusion on a beam portion extended from the lock release member extending towards the housing;
in the housing, an engaging portion provided in an elastic beam portion, in which one side is opened for receiving said beam portion, provided with the engaging portion for engaging with said engaging pawl and a notch for receiving said protrusion as well as a guide portion for guiding the distal end of the beam portion; and
the lock and release member, after the connector is extracted, for moving the lock release member to a set position where a top end of the beam portion is made flat, and when the connector is extracted, the connector is separated from the housing by releasing the engagement between the engaging pawl with the engaging portion by pushing up the elastic beam portion of the housing by bending the beam portion and thereby storing elastic energy, and by moving the lock release member to the reset position automatically using the elastic energy stored in the beam portion.

6. A locking and unlocking mechanism according to claim 5, wherein said engaging pawl comprises a forward descending inclined plane provided at one of the receiving portion and the engaging pawl and an abutting portion for abutting to said inclined plane, and, at the time of extracting the connector, said inclined plane and said abutting portion bend the beam portion of the lock release mechanism toward the elastic beam portion.

7. A locking and unlocking mechanism according to claim 5, wherein said lock release member comprises an engaging portion for receiving said engaging pawl and said engaging portion comprises an inner downward periphery and a top end pushing portion for pushing said periphery, and the top end pushing portion of the engaging pawl and said internal periphery make the beam portion of the lock release member bend to the opposite side of the elastic beam member.

8. A locking and unlocking mechanism according to claim 1, wherein said lock release member comprises a gripping portion for extracting the connector.

9. A method for locking and unlocking a cable connector comprising a connector for holding an end of a cable and an elastically deformable lock release member slidably attached to the outside of the cable holding member and a housing comprising an elastic beam portion for receiving said connector and conducting the cable, the cable connector being unlocked by sliding the lock release member of the connector fitted in the housing from the set position to the release position, wherein the method comprises:
fitting the connector into the housing, at the time of inserting the connector, by the steps of: inserting the cable holding member into the housing, pushing up the elastic beam portion by a part of the lock release member, engaging the engaging portion of the elastic beam portion with the engaging pawl of the cable holding member, and by moving the lock release member to the set position by the elastic energy of the elastically deformed lock release member caused by being pushed by the cable holding member; and
disconnecting the connector from the housing, at the time of extracting the connector, by the steps of: extracting the lock release member, pushing up the elastic beam portion for releasing the engagement between the engaging portion of the elastic beam portion and the engaging pawl of the cable holding member and moving the lock release member to the reset position by the elastic energy of the lock release member caused by the elastic deformation after the connector is extracted.

10. A locking and unlocking mechanism for locking and unlocking a connector, comprising a cable holding member for holding an end of a cable and a lock release member slidably attached to the outside of the cable holding member, to a housing for receiving said connector and for conducting the cable;

wherein, at the time of inserting the connector, a pushing operation of the lock release member allows connection of the lock release member to the housing by setting the lock release member at a set position by engaging of an engaging pawl provided with one of the cable holding member or the lock release member with an engaging portion provided with the other one of the cable holding member and the lock release member by pushing up an elastic beam portion provided in one of the cable holding member and the lock release member by means of a protrusion provided with the other one of the cable holding member and the lock release member;

at the time of extracting the connector, the connector is released from the housing by sliding the lock release member in a releasing direction for pushing up an elastic beam portion by the protrusion; and the lock and unlock mechanism further comprises an automatic retracting device for moving the lock release mechanism to the set position and to the reset position at the time of inserting and extracting the connector, wherein the automatic retracting device comprises an elastic body provided between a cable holding member and the lock release member, pressed at the time of inserting the connector.

* * * * *